(12) United States Patent
Liu

(10) Patent No.: US 12,719,721 B2
(45) Date of Patent: Aug. 25, 2026

(54) CONFIGURATION METHOD AND APPARATUS FOR JOINT CHANNEL ESTIMATION, AND DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 320 days.

(21) Appl. No.: 18/284,488

(22) PCT Filed: Apr. 2, 2021

(86) PCT No.: PCT/CN2021/085451
§ 371 (c)(1),
(2) Date: Sep. 27, 2023

(87) PCT Pub. No.: WO2022/205475
PCT Pub. Date: Oct. 6, 2022

(65) Prior Publication Data

US 2024/0163135 A1 May 16, 2024

(51) Int. Cl.
*H04L 25/02* (2006.01)
*H04L 5/00* (2006.01)

(52) U.S. Cl.
CPC ........ *H04L 25/0224* (2013.01); *H04L 5/0051* (2013.01)

(58) Field of Classification Search
CPC .......................... H04L 25/0224; H04L 5/0051
See application file for complete search history.

(56) References Cited

U.S. PATENT DOCUMENTS

2014/0092827 A1 4/2014 Jöngren et al.
2018/0145809 A1 5/2018 Kwak et al.
2021/0014095 A1 1/2021 Ly et al.
2021/0153038 A1* 5/2021 Ke ........................ H04L 5/0091
2021/0160685 A1* 5/2021 Ke ........................ H04W 8/205
2022/0240261 A1* 7/2022 Taherzadeh Boroujeni ................ H04W 72/23

(Continued)

FOREIGN PATENT DOCUMENTS

CN 111357235 A 6/2020
CN 112291167 A 1/2021

(Continued)

OTHER PUBLICATIONS

International Search Report of PCT/CN2021/085451 dated Jan. 4, 2021 with English translation, (4p).

(Continued)

*Primary Examiner* — Zhiren Qin
(74) *Attorney, Agent, or Firm* — Arch & Lake LLP; Hao Tan; Shen Wang

(57) ABSTRACT

Provided in the embodiments of the present disclosure are a configuration method and apparatus for joint channel estimation, and a device and a storage medium. The configuration method for joint channel estimation provided in the embodiments of the present disclosure is executed by a terminal, and comprises: receiving configuration information of joint channel estimation, wherein the configuration information is used by the terminal to perform joint channel estimation.

18 Claims, 6 Drawing Sheets

(56) References Cited

U.S. PATENT DOCUMENTS

| | | | | |
|---|---|---|---|---|
| 2023/0027316 | A1* | 1/2023 | Xu | H04L 5/0091 |
| 2024/0007247 | A1* | 1/2024 | Ly | H04W 72/232 |
| 2024/0015707 | A1* | 1/2024 | Ly | H04L 5/0078 |
| 2024/0187179 | A1* | 6/2024 | Kurita | H04L 5/0051 |
| 2024/0333557 | A1* | 10/2024 | Ly | H04L 5/0051 |

FOREIGN PATENT DOCUMENTS

| | | | |
|---|---|---|---|
| WO | 2017193878 | A1 | 11/2017 |
| WO | 2020030254 | A1 | 2/2020 |
| WO | 2020247359 | A1 | 12/2020 |

OTHER PUBLICATIONS

Huawei, HiSilicon, "Design of DL DMRS for data transmission", 3GPP TSG RAN WG1 Meeting #90, R1-1712243, Prague, Czech Republic, Aug. 21-25, 2017, (8p).

Notice of Allowance of Chinese Application No. 202180001044.4 dated Oct. 22, 2025, (6p).

RP-202703, Ericsson, "Study on support of reduced capability NR devices," 3GPP TSG RAN meeting #90e Electronic meeting, Dec. 7-11, 2020 ,(36p).

R1-135480, LG Electronics, "D2D Communication Physical Channel Design," 3GPP TSG RAN WG1 Meeting #75, San Francisco, USA, Nov. 11-15, 2013, (8p).

* cited by examiner

CONFIGURATION METHOD AND APPARATUS FOR JOINT CHANNEL ESTIMATION, AND DEVICE AND STORAGE MEDIUM

CROSS-REFERENCE TO RELATED APPLICATION

The present application is a U.S. national phase application of International Application No. PCT/CN2021/085451 filed on Apr. 2, 2021, the entire content of which is incorporated herein by reference for all purposes.

TECHNICAL FIELD

The embodiments of the present disclosure relate to the field of wireless communication, but are not limited to the field of wireless communication, and in particular, relate to a configuration method and apparatus for joint channel estimation, a communication device, and a storage medium.

BACKGROUND

In order to improve the coverage performance of the network, in the related art, the repeated transmission mode is used to enhance the coverage performance of the network. For example, the performance of uplink coverage is improved through repeated transmission in the time domain. However, the method of repeated transmission in the time domain may result in a low utilization rate of spectrum resources and additional delay. The related art also points out that joint channel estimation is performed by utilizing the bundling of a demodulation reference signal (DMRS) of Physical Uplink Shared Channel (PUSCH) transmission across slots or across repeated transmissions to improve the accuracy of channel estimation, thereby improving the coverage performance of the network.

SUMMARY

The present disclosure provides a configuration method, apparatus, device and storage medium for joint channel estimation.

According to a first aspect of the embodiments of the present disclosure, there is provided a configuration method for joint channel estimation, the method being executed by a terminal, including:

- receiving configuration information of joint channel estimation; where the configuration information is used for the terminal to perform the joint channel estimation.

According to a second aspect of the embodiments of the present disclosure, there is provided a configuration method for joint channel estimation, the method being executed by a network device, including:

- delivering configuration information for a terminal to perform joint channel estimation; where the configuration information is used for the terminal to perform the joint channel estimation.

According to a third aspect of the embodiments of the present disclosure, there is provided a configuration apparatus for joint channel estimation, where the apparatus is applied to a network device and includes: a processor and an interface circuit;

- the interface circuit is configured to receive a code instruction and transmit the code instruction to the processor;

- the processor is configured to execute the code instruction to perform the steps in any of the above methods.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the embodiments of the present disclosure.

FIG. 7 is a first structural block diagram of a configuration apparatus for joint channel estimation according to an embodiment of the present disclosure.

FIG. 8 is a second structural block diagram of a configuration apparatus for joint channel estimation according to an embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

The terms used in the embodiments of the present disclosure are for the purpose of describing particular embodiments only and are not intended to limit the embodiments of the present disclosure. As used in the embodiments of the present disclosure and the appended claims, the singular forms “a/an”, and “the” are intended to include the plural forms as well, unless the context clearly dictates otherwise. It should also be understood that the term “and/or” as used herein refers to and includes any or all possible combinations of one or more of the associated listed items.

It should be understood that although the terms first, second, third, etc. may be used in the embodiments of the present disclosure to describe various pieces of information, such information should not be limited by these terms. These terms are only used to distinguish the same type of information from each other. For example, the first information may also be referred to as second information, and similarly, the second information may also be referred to as the first information, without departing from the scope of the embodiments of the present disclosure. Depending on the context, the words "if" and "in case of" as used herein can be interpreted as "at the time of" or "when" or "in response to determining".

To better describe any embodiment of the present disclosure, an embodiment of the present disclosure takes an application scenario of one access control as an example for illustrative description.

Figure 1:
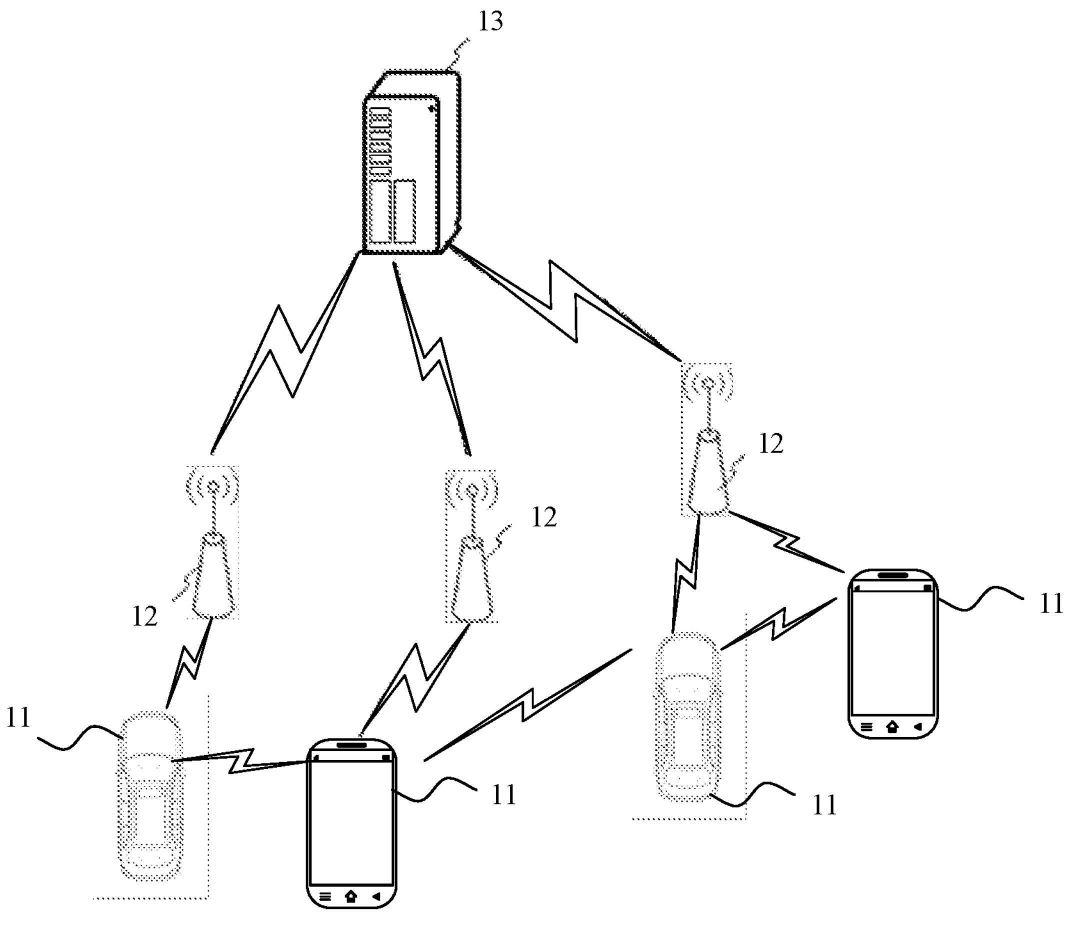
FIG. 1 is a schematic structural diagram of a wireless communication system according to an embodiment of the present disclosure.

FIG. 1 shows a schematic structural diagram of a wireless communication system provided by an embodiment of the present disclosure. As shown in FIG. 1, the wireless communication system is a communication system based on cellular mobile communication technology, and the wireless communication system may include: several terminals 11 and several base stations 12.

The terminal 11 may be a device that provides voice and/or data connectivity to the user. The terminal 11 may communicate with one or more core networks via a radio access network (RAN), and the terminal 11 may be an IoT terminal such as a sensor device, a mobile phone (or called a "cellular" phone) and a computer with the IoT terminal, for example, may be a fixed, portable, pocket, hand-held, built-in computer or a vehicle-mounted apparatus, such as a station (STA), a subscriber unit, a subscriber station, a mobile station, a mobile, a remote station, an access point, a remote terminal, an access terminal, a user terminal, a user agent, a user device, or a user equipment (terminal). Alternatively, the terminal 11 may also be a device of an unmanned aerial vehicle. Alternatively, the terminal 11 may also be a vehicle-mounted device, for example, a trip computer with a wireless communication function, or a wireless terminal connected to an external trip computer. Alternatively, the terminal 11 may also be a roadside device, for example, a street light, a signal light, or other roadside devices with a wireless communication function.

The base station 12 may be a network-side device in a wireless communication system. The wireless communication system may be the 4th generation mobile communication (4G) system, also known as a long term evolution (LTE) system; or, the wireless communication system may also be a 5G system, also known as a new radio (NR) system or 5G NR system. Alternatively, the wireless communication system may also be a next-generation system of the 5G system. Among them, the access network in the 5G system can be called New Generation-Radio Access Network (NG-RAN).

The base station 12 may be an evolved base station (eNB) used in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; the distributed unit is provided with a physical (PHY) layer protocol stack, and the specific implementation of the base station 12 is not limited in the embodiments of the present disclosure.

A wireless connection can be established between the base station 12 and the terminal 11 through a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for example, the wireless air interface is a new air interface; alternatively, the wireless air interface may also be a wireless air interface based on a next-generation mobile communication network technology standard of 5G.

In some embodiments, an End to End (E2E) connection may also be established between the terminals 11, for example, vehicle to vehicle (V2V) communication, vehicle to Infrastructure (V2I) communication and vehicle to pedestrian (V2P) communication in vehicle to everything (V2X) communication, and other scenarios.

In some embodiments, the above wireless communication system may further include a network management device 13.

Several base stations 12 are respectively connected to the network management device 13. The network management device 13 may be a core network device in the wireless communication system, for example, the network management device 13 may be a mobility management entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS), etc. The implementation form of the network management device 13 is not limited in the embodiments of the present disclosure.

For the cellular mobile communication system, the coverage performance of the network is very important. This directly affects the operator's network deployment. In the case of dense network deployment, the coverage performance of the network will be better, but it will increase the cost of the operator. In the case of sparse network deployment, the coverage performance of the network is relatively poor.

In order to improve the coverage performance of the network, the repeated transmission mode can be used to enhance the coverage performance of the network. For example, the performance of uplink coverage is improved through repeated transmission in the time domain. However, the method of repeated transmission in the time domain may result in a low utilization rate of spectrum resources and additional delay. In some embodiments, the accuracy of channel estimation can be improved by joint channel estimation using DMRS of the Physical Uplink Shared Channel (PUSCH) or the Physical Uplink Control Channel (PUCCH) transmission of the same user between different slots or within the same slot, thereby improving the coverage performance of the network. That is, by supporting DMRS bundling across slots or across repeated transmissions, the coverage quality and coverage area of PUSCH and PUCCH are enhanced.

For the joint channel estimation based on DMRS bundling across slots or across repeated transmissions, the terminal, the base station and the like need to satisfy certain power consistency and phase continuity conditions.

Figure 2:
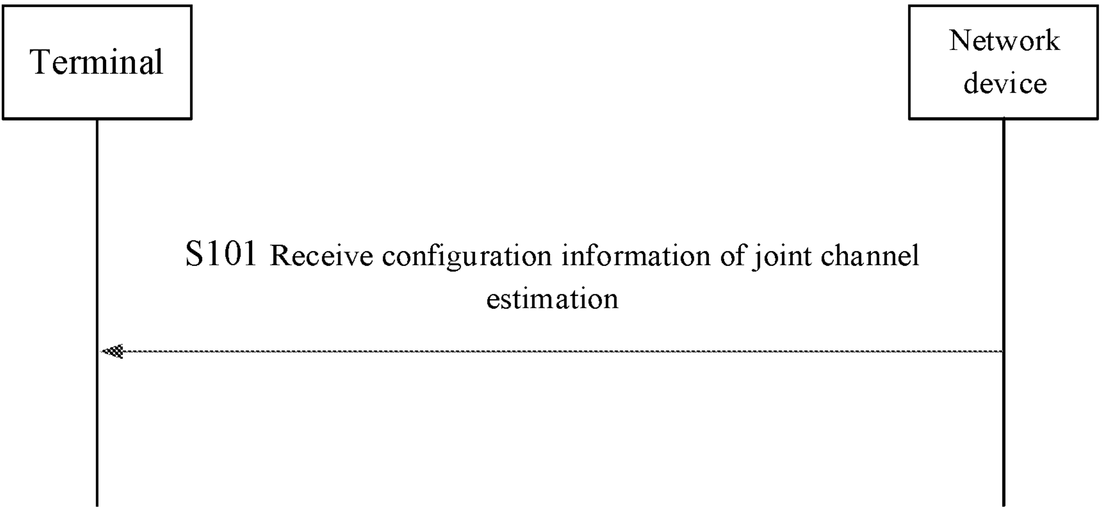
FIG. 2 is a first flowchart of a configuration method for joint channel estimation according to an embodiment of the present disclosure.

In this regard, as shown in FIG. 2, an embodiment of the present disclosure provides a configuration method for joint channel estimation. The method is executed by a terminal, and includes the following steps.

In step S101: configuration information of joint channel estimation is received; where the configuration information is used for the terminal to perform the joint channel estimation.

In the embodiments of the present disclosure, the terminal may acquire the configuration information of the joint channel estimation from a network device. Here, the network device may be a device having a function of exchanging information with the terminal, such as a base station or a core network device. The terminal may determine, according to the configuration information, the configuration of the DMRS required for joint channel estimation, and the like. Alternatively, the terminal may determine, based on the configuration information, whether to perform joint channel estimation, or a time period corresponding to joint channel estimation, and the like.

The terminal acquires the configuration information provided by the network device and performs the corresponding joint channel estimation, which can facilitate the terminal to perform the above joint channel estimation when the condition configured by the configuration information is met, improve the accuracy of the channel estimation, and further improve the coverage performance of the network.

In some embodiments, the configuration information includes at least:

time range information of DMRS bundling required for the terminal to perform the joint channel estimation.

DMRS widely exists in physical channels of various communication scenarios, such as downlink Physical Broadcast Channel (PBCH), Physical Downlink Control Channel (PDCCH) and Physical Downlink Shared Channel (PDSCH), and uplink PUCCH and PUSCH, etc., for demodulation of uplink and downlink data. For a specific terminal, it can be used to perform channel estimation of the wireless channel.

In the embodiments of the present disclosure, DMRS bundling across slots or across repeated transmissions may be used to implement joint channel estimation. That is to say, the above time range information may represent a plurality of slots or retransmission ranges spanned by the time period for joint channel estimation. In the time period corresponding to the time range information, a fixed DMRS sequence setting may be used, so as to facilitate the performing of joint channel estimation, and improve the accuracy of channel estimation.

In addition, the configuration information may also include configuration information of the DMRS timing sequence or other parameters, so that the terminal can perform joint channel estimation according to the DMRS based on the configuration information.

Figure 3:
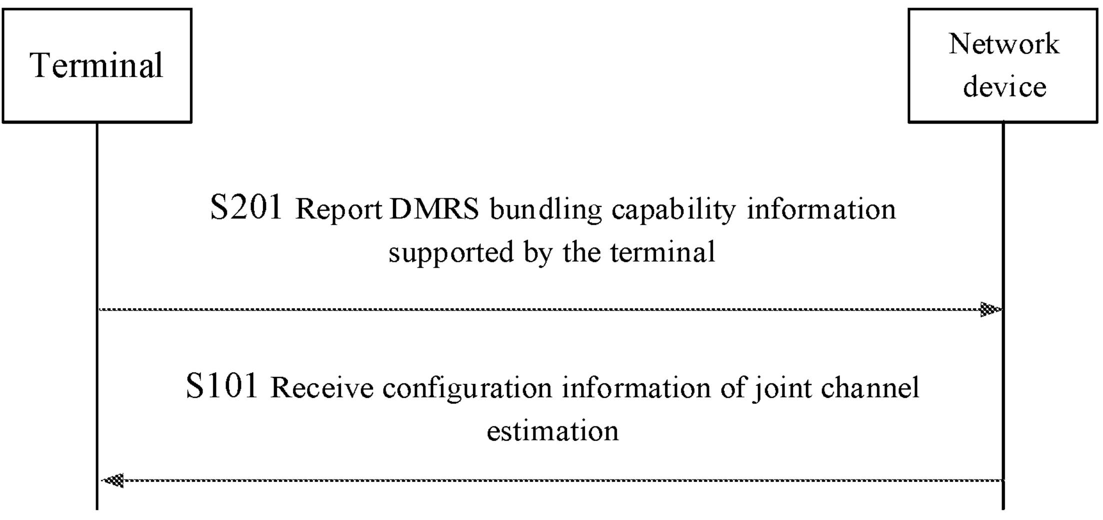
FIG. 3 is a second flowchart of a configuration method for joint channel estimation according to an embodiment of the present disclosure.

In some embodiments, as shown in FIG. 3, the method further includes the following steps.

In step S201, DMRS bundling capability information supported by the terminal is reported, where the DMRS bundling capability information is used by the network device to determine the configuration information of the joint channel estimation.

To achieve joint channel estimation by supporting DMRS bundling across slots or across repeated transmissions, the terminal needs to maintain power consistency and phase continuity within a certain time range, and the terminal needs to support and satisfy the performance requirements such as power and phase. Therefore, the terminal can report the DMRS bundling capability information supported by itself, inform the network device whether it supports joint channel estimation, or inform the network device of the range of performances such as power and phase supported by itself.

In this way, it is convenient for the network device to perform corresponding configuration based on the capability reported by the terminal. If the capability reported by the terminal indicates that it cannot support joint channel estimation, the network device may not perform configuration of joint channel estimation. If the capability reported by the terminal indicates that it can support the above-mentioned joint channel estimation, the network device may provide corresponding configuration information to facilitate the terminal to perform joint channel estimation.

In some embodiments, the DMRS bundling capability information includes:

indication information of whether the DMRS bundling capability of the terminal supports joint channel estimation.

In the embodiments of the present disclosure, the DMRS bundling capability information reported by the terminal may be used to inform the network device whether the terminal supports joint channel estimation. The terminal may determine whether joint channel estimation is supported based on its own DMRS bundling capability.

In addition, the terminal can also determine the time period during which it supports joint channel estimation according to its own DMRS bundling capability, and report it to the network device.

The terminal may also directly report the relevant parameters of its own DMRS bundling capability to the network device, and the network device determines whether the terminal supports joint channel estimation.

In some embodiments, the method further includes:

based on the protocol agreement, determining indication information of whether the DMRS bundling capability of the terminal supports the joint channel estimation.

In the embodiments of the present disclosure, the DMRS bundling capability information of the above-mentioned terminal is used for indicating whether the terminal supports joint channel estimation. Therefore, the terminal can determine whether it supports the joint channel estimation based on its own DMRS bundling capability, and then report it.

The determination standard of the terminal may be determined according to the protocol agreement. Therefore, the terminal may determine whether its own DMRS bundling capability meets the condition of joint channel estimation based on the protocol agreement.

In some embodiments, the DMRS bundling capability includes one or more of the following:

power consistency of the terminal; and phase continuity of the terminal;

The above-mentioned DMRS bundling capability may include the capability of parameters such as power and phase supported by the terminal. For example, the terminal determines whether the above-mentioned DMRS bundling capability of the terminal satisfies the power consistency and the phase continuity requirement required for joint channel estimation based on the threshold range specified in the protocol, and report it to the network device, so that the network device can perform corresponding configuration based on the report of the terminal.

In the embodiments of the present disclosure, the protocol may specify that the terminal needs to satisfy both the power consistency condition and the phase continuity condition, that is, the power of the terminal meets the predetermined power consistency condition, and the phase meets the predetermined phase continuity condition at the same time, so that the condition of joint channel estimation is satisfied.

The above-mentioned DMRS bundling capability includes one or more of the following:

- maximum and minimum values of power supported by the terminal;
- the maximum absolute value of the fluctuation deviation of the power of the terminal within a predetermined period of time; and
- a standard deviation or variance value of the fluctuation deviation of the power of the terminal within a predetermined period of time.

The above-mentioned power consistency information may be expressed in terms of the range of power supported by the terminal, the range of power fluctuations, and the like. The terminal can determine whether the terminal meets the requirement of joint channel estimation by judging whether the above-mentioned maximum value, minimum value and fluctuation deviation of the power supported by the terminal meet the threshold conditions required for joint channel estimation.

It should be noted that, whether the above-mentioned power consistency information satisfies the requirement of joint channel estimation can be agreed through a protocol. Therefore, the terminal can also determine whether it meets the requirement of joint channel estimation based on its own power consistency information, and report it to the network device for the network device to perform corresponding configuration.

For example, the minimum and maximum values of power in a certain time range; the maximum absolute value of the relative deviation of power fluctuations in a certain time range; and the maximum value of the variance or standard deviation of power fluctuations in a certain time range, etc. for the terminal to perform joint channel estimation may be agreed in advance by the protocol. In this way, it can be determined whether the terminal satisfies the condition of joint channel estimation based on whether the power consistency information of the terminal satisfies the range agreed in the protocol.

The above-mentioned DMRS bundling capability may also include one or more of the following:

- the maximum and minimum phase values supported by the terminal;
- the maximum absolute value of the fluctuation deviation of the phase of the terminal within a predetermined period of time; and
- the standard deviation or variance value of the fluctuation deviation of the phase of the terminal within a predetermined period of time.

Similar to the related parameters of the power consistency, the terminal can report its own capability by determining whether the maximum and minimum phase values and fluctuation deviation etc. supported by the terminal meet the threshold conditions required for joint channel estimation, so as to facilitate the network device to deliver the corresponding configuration information.

The phase continuity information to meet the requirement of joint channel estimation can also be agreed through a protocol. Therefore, the terminal can also determine whether the threshold condition specified in the protocol is satisfied based on the relevant parameters of its own phase consistency, and report it to the network device for the network device to perform corresponding configuration.

For example, the minimum and maximum phase values in a certain time range; the maximum absolute value of the relative deviation of phase fluctuations in a certain time range; and the maximum value of fluctuation variance or standard deviation of phase in a certain time range, etc. for the terminal to perform joint channel estimation may be agreed in advance by the protocol. In this way, it can be determined whether the terminal satisfies the condition of joint channel estimation based on whether the phase continuity information of the terminal satisfies the range agreed in the protocol.

In some embodiments, the reporting the DMRS bundling capability information supported by the terminal includes:

- reporting terminal capability reporting information carrying the DMRS bundling capability information.

In the embodiments of the present disclosure, the terminal may carry the above-mentioned DMRS bundling capability information in the terminal capability reporting information, and report it to the network device. The terminal capability reporting information can also be used to carry other capabilities of the terminal. Therefore, the network device can determine the configuration information of the above joint channel estimation based on the terminal capability reporting information, and can also configure other information and perform resource scheduling for data transmission by the terminal, etc.

In this way, the terminal does not need to perform additional signaling transmission when reporting the DMRS bundling capability information, and can report the DMRS bundling capability information by using the existing terminal capability reporting information.

In some embodiments, the reporting the DMRS bundling capability information supported by the terminal includes:

- reporting auxiliary information used for indicating the DMRS bundling capability information.

In the embodiments of the present disclosure, the DMRS bundling capability information of the terminal may be reported through auxiliary information. The auxiliary information can be reported as separate signaling, or reported by being carried in other existing signaling. It can be carried in the signaling through explicit information, or it can be implicitly indicated through other information.

In some embodiments, the reporting auxiliary information used for indicating the DMRS bundling capability information includes:

- explicitly reporting dedicated information carrying the auxiliary information; or
- implicitly reporting predetermined information carrying the auxiliary information.

Here, the dedicated information may include the auxiliary information carried in the dedicated information field of the predetermined signaling, or the auxiliary information dedicated information carried in the dedicated signaling may be dedicated to carrying the above-mentioned auxiliary information, and the content of the auxiliary information may include the DMRS capability information of the terminal. By reporting the DMRS bundling capability of the terminal through the dedicated information, it is convenient for the network device to determine the configuration information for the terminal to perform joint channel estimation.

In addition, the predetermined information may be information for reporting other content, rather than the signaling dedicated to reporting the auxiliary information. Implicit carrying means that the auxiliary information reported by the terminal is implicitly represented by different situations of the original information content, signaling format, coding method, scrambling method, and retransmission times of the predetermined information. For example, the above-mentioned auxiliary information may include indicating whether the DMRS bundling capability of the terminal satisfies the condition for performing joint channel estimation. If the DMRS bundling capability of the terminal satisfies the condition for joint channel estimation, it is reported through the first coding method of the predetermined information; if the DMRS bundling capability of the terminal does not meet the condition for joint channel estimation, it is reported through the second coding method of the predetermined information. In this way, the network device can determine whether the DMRS bundling capability of the terminal satisfies the condition for joint channel estimation only by the encoding method of the predetermined information, and then provide corresponding configuration information.

In some embodiments, the method further includes:

performing the joint channel estimation based on the received configuration information of the joint channel estimation.

After receiving the configuration information provided by the network device, the terminal may perform uplink transmission based on the scheduling of the network device, and perform corresponding joint channel estimation based on the configuration information during the uplink transmission.

Figure 4:
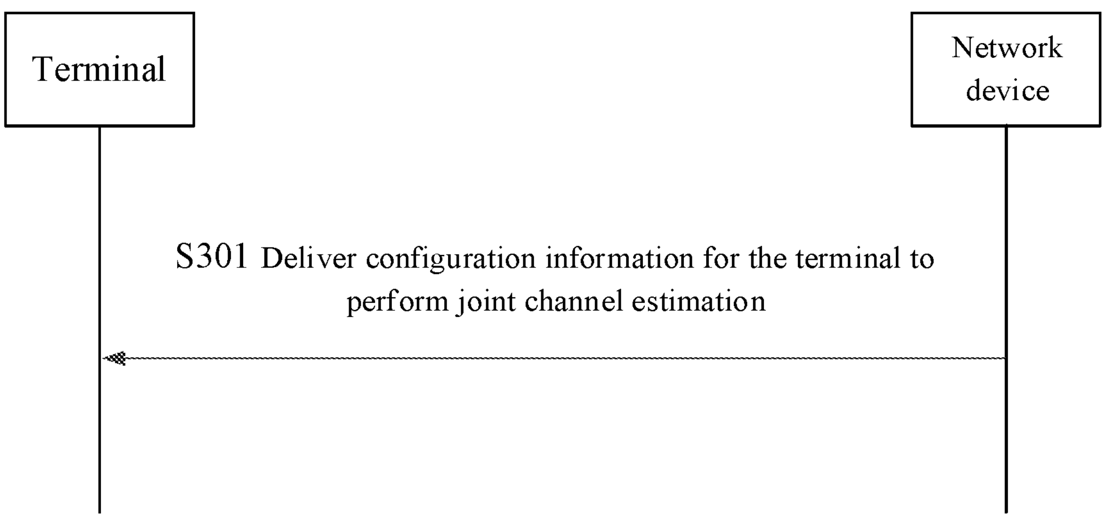
FIG. 4 is a third flowchart of a configuration method for joint channel estimation according to an embodiment of the present disclosure.

As shown in FIG. 4, an embodiment of the present disclosure provides a configuration method for joint channel estimation. The method is executed by a network device, and includes the following steps.

In step S301, configuration information for the terminal to perform joint channel estimation is delivered; where the configuration information is used for the terminal to perform the joint channel estimation.

In the embodiments of the present disclosure, the network device may perform configuration for joint channel estimation on the terminal, and therefore deliver corresponding configuration information to the terminal. Here, the network device may be a device having a function of exchanging information with the terminal, such as a base station or a core network device. In this way, the terminal can perform joint channel estimation based on the configuration information. For example, the terminal may determine the configuration of the DMRS for joint channel estimation according to the configuration information, and perform joint channel estimation based on the DMRS. Alternatively, the terminal may determine, based on the configuration information, whether to perform joint channel estimation, or a time period corresponding to joint channel estimation, and the like.

The network device provides the configuration information, so that the terminal can perform the corresponding joint channel estimation when the condition for joint channel estimation is satisfied, thereby improving the accuracy of the channel estimation and further improving the coverage performance of the network.

In some embodiments, the configuration information includes at least:

time range information of DMRS bundling required for the terminal to perform the joint channel estimation.

DMRS widely exists in physical channels of various communication scenarios, such as downlink PBCH, PDCCH, and PDSCH, and uplink PUCCH and PUSCH, etc., for demodulation of uplink and downlink data. For a specific terminal, it can be used to perform channel estimation of the wireless channel.

In the embodiments of the present disclosure, DMRS bundling across slots or across repeated transmissions may be used to implement joint channel estimation. That is to say, the above time range information may represent a plurality of slots or retransmission ranges spanned by the time period for joint channel estimation. In the time period corresponding to the time range information, a fixed DMRS sequence setting may be used, so as to facilitate joint channel estimation, and improve the accuracy of channel estimation.

In some embodiments, the delivered configuration information includes N sets, where N is an integer greater than or equal to 1.

In the embodiments of the present disclosure, the network device may configure one or more sets of configuration information for the terminal, and the terminal may use different configuration information to perform joint channel estimation in different situations. In addition, the network device may also configure the same configuration information or different configuration information for a plurality of terminals, for example, configure the same configuration information for all terminals in a cell, or configure the same configuration information for grouped terminals.

In the embodiments of the present disclosure, the configuration information of the joint channel estimation performed by the network device on the terminal may be configured correspondingly based on different configuration granularities. Specifically, the network device may use different SCS, PUCCH, PUSCH, service type, frequency modulation mode, DMRS mode, or one or more different information in different DRMS bundling capability information reported by the terminal as the configuration granularity, and determine N sets of configuration information accordingly, where N may be one set or a plurality of sets, and the N sets of configuration information are delivered.

The terminal may activate one or more sets of the above N sets of configuration information based on the configuration of the network device, and use the activated configuration information in the process of joint channel estimation.

Figure 5:
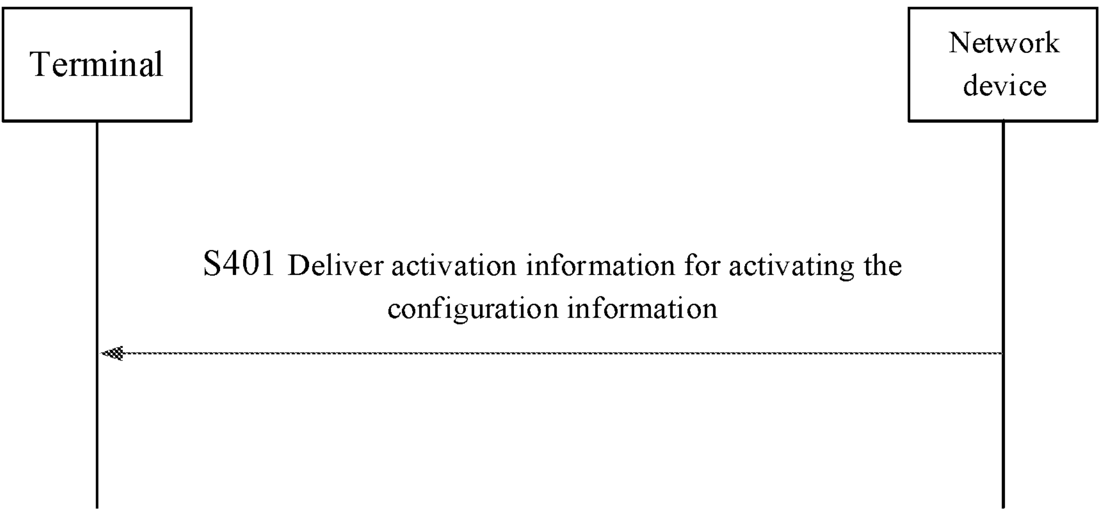
FIG. 5 is a fourth flowchart of a configuration method for joint channel estimation according to an embodiment of the present disclosure.

In some embodiments, as shown in FIG. 5, the method further includes the following steps.

In step S401, activation information for activating the configuration information is delivered, where the activation information is used for activating the terminal to support M sets of configuration information, where M is a positive integer less than or equal to N.

The network device can also trigger the configuration information to take effect on the terminal by delivering the activation information. For example, if the activation information triggers that the terminal can support M sets of configuration information within the same time period, the terminal can use the activated configuration information to perform the corresponding joint channel estimation based on the transmission situation.

The quantity of configuration information activated by the activation information delivered by the network device is not greater than the total quantity of configuration information delivered by the network device. In this way, the network device can configure a plurality sets of configuration information for the terminal based on different parameters, and then activate at least part of the configuration information based on different requirements or transmission states, without repeated configuration.

In some embodiments, the delivering the activation information for activating the configuration information includes:

delivering the activation information of the configuration information through DCI or MAC-CE.

The above activation information can be delivered through information such as DCI or MAC-CE, the newly added information field carries the above activation information, to inform the terminal which configuration information is activated, so as to facilitate the terminal to determine the currently available configuration information.

In some embodiments, the delivering the configuration information for the terminal to perform joint channel estimation includes:

delivering the configuration information through radio resource control (RRC) signaling.

The base station may carry the configuration information through RRC signaling and deliver it to the terminal, or may carry the configuration information through other signaling and deliver it to the terminal, for example, through RRC semi-static configuration, RRC pre-configuration combined with DCI indication activation, or through MAC pre-configuration combined with DCI indication activation or other explicit indication manners.

Figure 6:
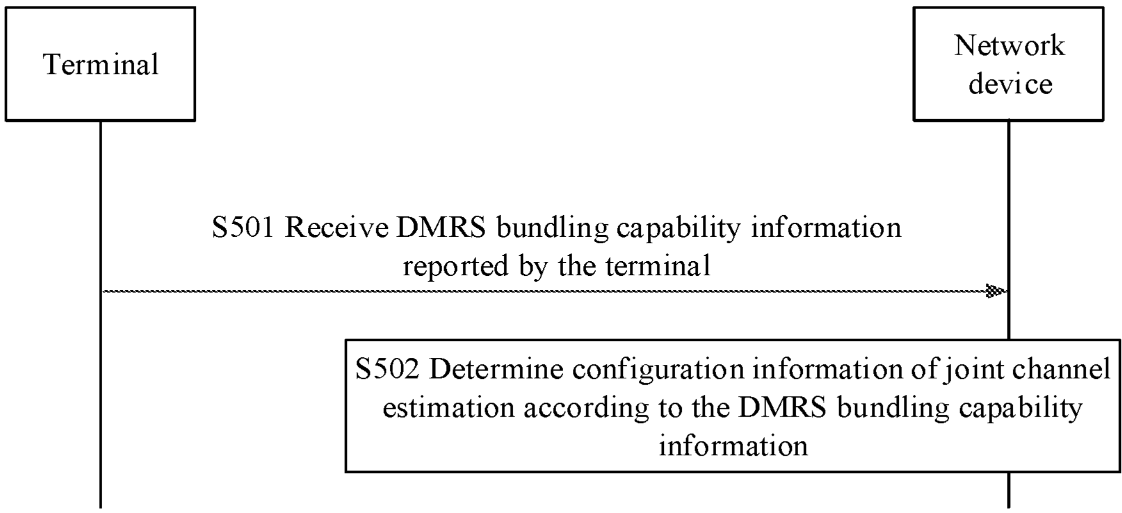
FIG. 6 is a fifth flowchart of a configuration method for joint channel estimation according to an embodiment of the present disclosure.

In some embodiments, as shown in FIG. 6, the method further includes the following steps.

In step S501, the DMRS bundling capability information reported by the terminal is received.

In step S502, the configuration information of the joint channel estimation is determined according to the DMRS bundling capability information.

To achieve joint channel estimation by supporting DMRS bundling across slots or across repeated transmissions, the terminal needs to maintain power consistency and phase continuity within a certain time range, and the terminal needs to support the performance requirements such as the power and phase. Therefore, the network device can determine whether the terminal supports joint channel estimation by acquiring the DMRS bundling capability information supported by the terminal, or acquire the range of performances such as the power and phase supported by the terminal.

In this way, the network device can perform corresponding configuration based on the capability reported by the terminal. If the terminal capability acquired by the network device indicates that the terminal cannot support joint channel estimation, the network device may not perform the configuration of joint channel estimation. If the terminal capability acquired by the network device indicates that the terminal can support the above-mentioned joint channel estimation, the network device may provide corresponding configuration information to facilitate the terminal to perform joint channel estimation.

In some embodiments, the delivering the configuration information for the terminal to perform joint channel estimation includes:

in response to the DMRS bundling capability information indicating that the terminal meets the condition for joint channel estimation, determining configuration information for the terminal to perform joint channel estimation; or determining whether the DMRS bundling capability information satisfies the threshold range agreed in a protocol; in response to the DMRS bundling capability information meeting the threshold range predetermined by the protocol, determining the configuration information for the terminal to perform joint channel estimation.

In the embodiments of the present disclosure, the condition that the terminal needs to meet to perform joint channel estimation can be agreed through the protocol, including the limitation of phase and power.

For example, the protocol may stipulate that the terminal needs to satisfy the maximum and minimum values of the phase and the maximum and minimum values of the power within a certain time range; the maximum absolute value of the relative deviation of the phase fluctuation and the maximum absolute value of the relative deviation of the power fluctuation within a certain time range; and the maximum value of the variance or standard deviation of the phase fluctuation, the maximum value of the variance or standard deviation of the power fluctuation within a certain time range, and the like.

If the DMRS bundling capability information reported by the terminal indicates that the terminal meets the above-mentioned threshold range agreed in the protocol, joint channel estimation can be performed, and therefore configuration information for the terminal to perform joint channel estimation can be delivered.

In the embodiments of the present disclosure, if the DMRS bundling capability information reported by the terminal is used for indicating whether the terminal meets the condition for joint channel estimation, or the time period during which the terminal supports the joint channel estimation, the network device determines the corresponding configuration information when the DMRS bundling capability information indicates that the terminal meets the condition, and determines not to configure the terminal when the DMRS bundling capability information indicates that the terminal does not meet the condition.

If the DMRS bundling capability information reported by the terminal is used to inform the network device of the terminal's capability parameter, the network device may determine whether the capability parameter reported by the terminal meets the threshold condition specified by the joint channel estimation based on the protocol agreement, and then perform corresponding configuration.

In some embodiments, the method further includes:

in response to the terminal meeting the predetermined condition, scheduling an uplink channel transmission of the terminal; where the terminal performs joint channel estimation based on the configuration information in the process of the uplink channel transmission.

The network device may schedule uplink channel transmission of the terminal when the terminal meets a predetermined condition. The predetermined condition here is the condition that the terminal needs to meet to perform joint channel estimation. The terminal performs uplink transmission based on the scheduling of the network device, and can perform joint channel estimation based on the configuration information provided by the network device in the process of uplink transmission, thereby improving the accuracy of channel estimation and improving the network coverage performance.

In some embodiments, the predetermined condition includes but is not limited to at least one of the following:

the terminal supports uplink channel transmission across slots or across repeated transmissions;

the uplink channel of the terminal is located at a fixed frequency domain location; or the terminal adopts a precoding method, a Transport block size (TBS) modulation method and a fixed beam.

That is, the terminal supports the above-mentioned joint channel estimation, and at the same time, the frequency domain position of the uplink channel, the precoding method, the modulation method of the TBS, and the beam are all fixed, which facilitates the above-mentioned joint channel estimation.

In some embodiments, the delivering the configuration information for the terminal to perform joint channel estimation includes:

delivering second dedicated information that explicitly carries the configuration information; where the second dedicated information includes configuration information carried in a dedicated information field of predetermined signaling or configuration information carried in dedicated signaling; or delivering second predetermined information that implicitly carries the configuration information.

In the embodiments of the present disclosure, the above configuration information may be delivered to the terminal in a manner of explicit indication. For example, the configuration information is delivered to the terminal by carrying the configuration information in the newly added dedicated signaling, or the configuration information is delivered to the terminal by newly adding dedicated information field in the existing predetermined signaling to carry the above configuration information.

In addition, the above configuration information can also be delivered in an implicit manner, for example, the configuration information is implicitly indicated by a Time Domain Resource Assignment (TDRA) index, or the configuration information is implicitly indicated by the number of retransmissions, and for another example, the configuration information is implicitly indicated by the PUCCH resource. That is to say, the content, format, quantity and other parameters with variability in the existing information are associated with the content to be provided by the configuration information and sent to the terminal. In this way, the terminal can determine the configuration information provided by the network device through the received information according to the predetermined rule. In this way, there is no need for additional signaling overhead, and there is no need to add or change the format of existing signaling, and the scope of application is relatively wide.

The embodiments of the present disclosure also provide the following examples.

In the embodiments of the present disclosure, for the configuration of thresholds or default conditions supporting joint channel estimation or DMRS bundling:

1. The phase and power constraints that support joint channel estimation or DMRS bundling can be specified by the protocol. For example, the maximum and minimum values of the phase and the maximum and minimum values of the power within a certain time range are specified; the maximum absolute value of the relative deviation of the phase fluctuation or power fluctuation within a certain time range is specified; and the maximum value of variance (or standard deviation) of the phase fluctuation or power fluctuation within a certain time range is specified, etc.
2. The terminal can report its own capability or auxiliary information. That is to say, the terminal can report the support for its own power consistency and phase continuity.

For example, the terminal can report its power consistency and phase continuity information as its own capability; or use its power consistency and phase continuity information as auxiliary information, and report it explicitly through the physical layer or high-layer dedicated information; or use the information of its power consistency and phase continuity as auxiliary information, and report it implicitly by using the existing information.

3. The scheduling of the base station can meet the following conditions:

the base station and the terminal back-to-back support uplink transmission cross repetitive transmissions or cross slots, such as PUCCH or PUSCH;

the frequency domain position is the same, and no frequency hopping occurs between slots or within slot;

the precoding, the modulation of the transport block size (TBS), and the beam used by the terminal remain unchanged.

In the embodiments of the present disclosure, for the trigger mechanism and configuration principle for supporting joint channel estimation or DMRS bundling:

the base station may perform separate triggering or separate configuration for a single terminal, and the base station may also perform joint triggering or joint configuration for a plurality of terminals (e.g., all terminals in a group or all terminals in a cell). When joint triggering is performed, all triggered terminals meet and can report the power consistency and phase continuity information supported by the terminals.

In addition, the base station can configure one or more sets of configuration information for the same terminal, and the configuration granularity can be configured based on the following different situations of information:

1. configure for different SCSs;
2. configure for different PUCCH formats;
3. configure for different service types;
4. configure for different retransmission times;
5. use different configurations for initial transmission and retransmission;
6. configure based on different hopping patterns or DMRS patterns;
7. report based on the capabilities of different terminals.

For the same terminal, N sets of configuration information of joint channel estimation can be maintained, including the duration and time range information of DMRS bundling. At a certain moment, a single terminal can activate M pieces of configuration information at the same time, where $M \leq N$. The base station may deliver the above N sets of configuration information to the terminal, and activate M pieces of configuration information therein.

In the embodiments of the present disclosure, the indication method for joint channel estimation or DMRS bundling may be in the form of explicit indication, and may also be in the form of implicit indication.

Figures 7, 8:
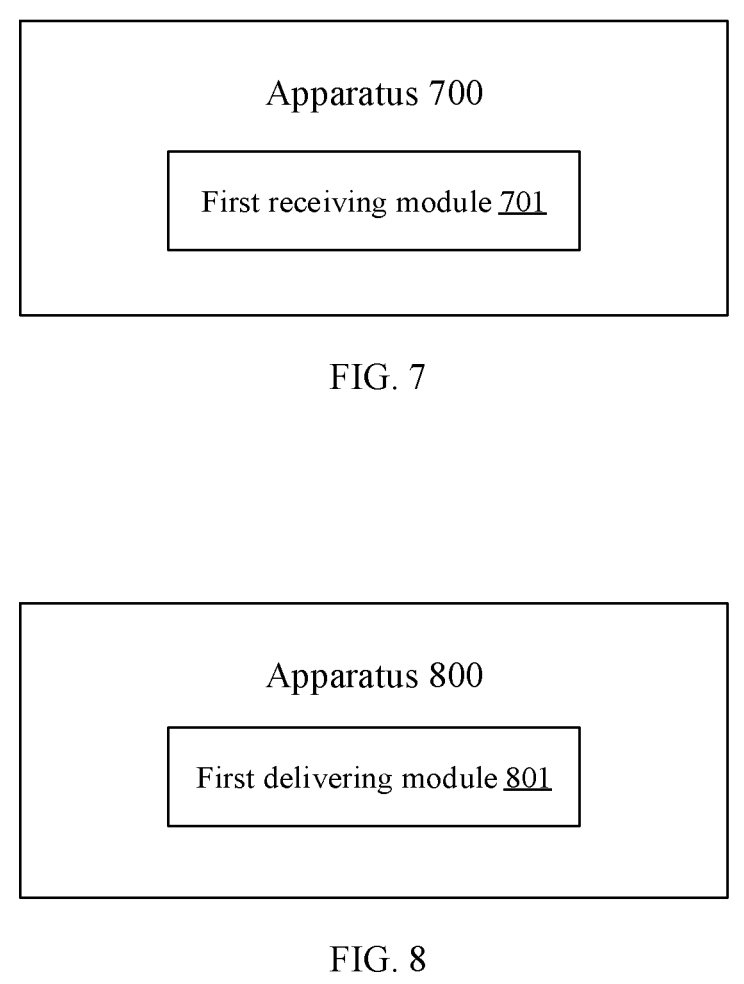

As shown in FIG. 7, an embodiment of the present disclosure further provides a configuration apparatus 700 for joint channel estimation, which is applied to a terminal, including:

a first receiving module 701, configured to receive configuration information of joint channel estimation; where the configuration information is used for the terminal to perform the joint channel estimation.

In some embodiments, the configuration information includes at least:

time range information of DMRS bundling required for the terminal to perform the joint channel estimation.

In some embodiments, the apparatus further includes:

a reporting module, configured to report the DMRS bundling capability information supported by the terminal, where the DMRS bundling capability information is used for the network device to determine the configuration information of the joint channel estimation.

In some embodiments, the DMRS bundling capability information includes:

indication information of whether the DMRS bundling capability of the terminal supports joint channel estimation.

In some embodiments, the method further includes:

a first determining module, configured to determine the indication information of whether the DMRS bundling capability of the terminal supports the joint channel estimation based on the protocol agreement.

In some embodiments, the DMRS bundling capability information includes one or more of the following:

power consistency information of the terminal;

phase continuity information of the terminal.

In some embodiments, the reporting module is further configured to:

report the DMRS bundling capability information as a terminal capability.

In some embodiments, the reporting module is further configured to:

report the DMRS bundling capability information as a kind of auxiliary information.

In some embodiments, the reporting module is further configured to:

explicitly report dedicated information carrying the auxiliary information;

or implicitly report first predetermined information carrying the auxiliary information.

In some embodiments, the apparatus further includes:

a processing module, configured to perform the joint channel estimation based on the received configuration information of the joint channel estimation.

As shown in FIG. 8, an embodiment of the present disclosure further provides a configuration apparatus 800 for joint channel estimation, which is applied to a network device, including:

a first delivering module 801, configured to deliver configuration information for the terminal to perform joint channel estimation; where the configuration information is used for the terminal to perform the joint channel estimation.

In some embodiments, the configuration information includes at least:

time range information of DMRS bundling required for the terminal to perform the joint channel estimation.

In some embodiments, the delivered configuration information includes N sets, where N is an integer greater than or equal to 1.

In some embodiments, the apparatus further includes:

a second delivering module, configured to deliver activation information for activating the configuration information, where the activation information is used for activating the terminal to support M sets of configuration information, where M is a positive integer less than or equal to N.

In some embodiments, the second delivering module is further configured to:

deliver the activation information of the configuration information through DCI or MAC-CE.

In some embodiments, the first delivering module is further configured to:

deliver the configuration information through RRC signaling.

In some embodiments, the apparatus further includes:

a second receiving module, configured to receive the DMRS bundling capability information reported by the terminal;

a second determining module, configured to determine the configuration information of the joint channel estimation according to the DMRS bundling capability information.

In some embodiments, the second determining module is further configured to:

in response to the DMRS bundling capability information indicating that the terminal meets the condition for joint channel estimation, determine the configuration information for the terminal to perform joint channel estimation; or determine whether the DMRS bundling capability information satisfies a threshold range agreed in the protocol; in response to the DMRS bundling capability information meeting the threshold range predetermined by the protocol, determine the configuration information for the terminal to perform joint channel estimation. In some embodiments, the apparatus further includes:

a scheduling module, configured to schedule an uplink channel transmission of the terminal in response to the terminal meeting a predetermined condition; where the terminal performs joint channel estimation based on the configuration information during the uplink channel transmission.

In some embodiments, the predetermined condition includes:

the terminal supports uplink channel transmission across slots or across repeated transmissions;

an uplink channel of the terminal is located at a fixed frequency domain location; and the terminal adopts a precoding method, a TBS modulation method and a fixed beam.

With respect to the apparatus in the above-mentioned embodiments, the specific manners for performing operations for individual modules therein have been described in detail in the embodiments regarding the methods, which will not be elaborated herein.

Figure 9:
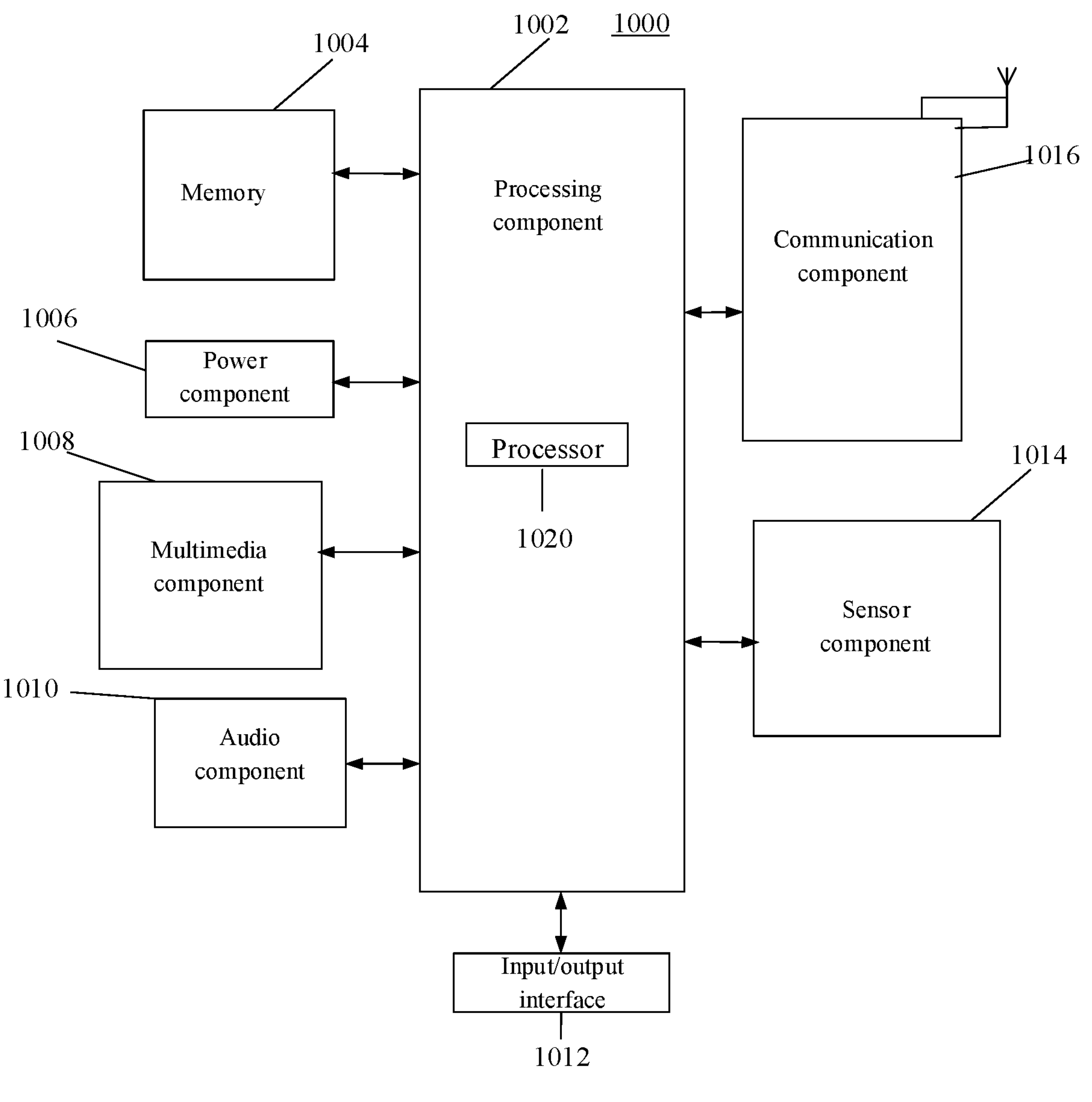
FIG. 9 is a first schematic structural diagram of a communication device according to an embodiment of the present disclosure.

FIG. 9 is a block diagram of a communication device according to an illustrative embodiment of the present disclosure. The communication device may be a terminal. For example, the communication device 1000 may be a mobile phone, a computer, a digital broadcast terminal, a messaging device, a gaming console, a tablet, a medical device, exercise equipment, a personal digital assistant, and the like.

Referring to FIG. 9, the communication device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the communication device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the communication device 1000. Examples of such data include instructions for any applications or methods operated on the communication device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the communication device 1000. The power component 1006 may include a power management system, one or more power sources, and any other components associated with the generation, management, and distribution of power in the communication device 1000.

The multimedia component 1008 includes a screen providing an output interface between the communication device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the communication device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the communication device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the communication device 1000. For instance, the sensor component 1014 may detect an open/closed status of the communication device 1000, relative positioning of components, e.g., the display and the keypad, of the communication device 1000, a change in position of the communication device 1000 or a component of the communication device 1000, a presence or absence of user contact with the communication device 1000, an orientation or an acceleration/deceleration of the communication device 1000, and a change in temperature of the communication device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the communication device 1000 and other devices. The communication device 1000 can access a wireless network based on a communication standard, such as WiFi, 2G, or 3G, or a combination thereof. In one illustrative embodiment, the communication component 1016 receives a broadcast signal or broadcast associated information from an external broadcast management system via a broadcast channel. In one illustrative embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the communication device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 1004, executable by the processor 1020 in the communication device 1000, for performing the above-described methods. For example, the non-transitory computer-readable storage medium may be a ROM, a RAM, a CD-ROM, a magnetic tape, a floppy disc, an optical data storage device, and the like.

Figure 10:
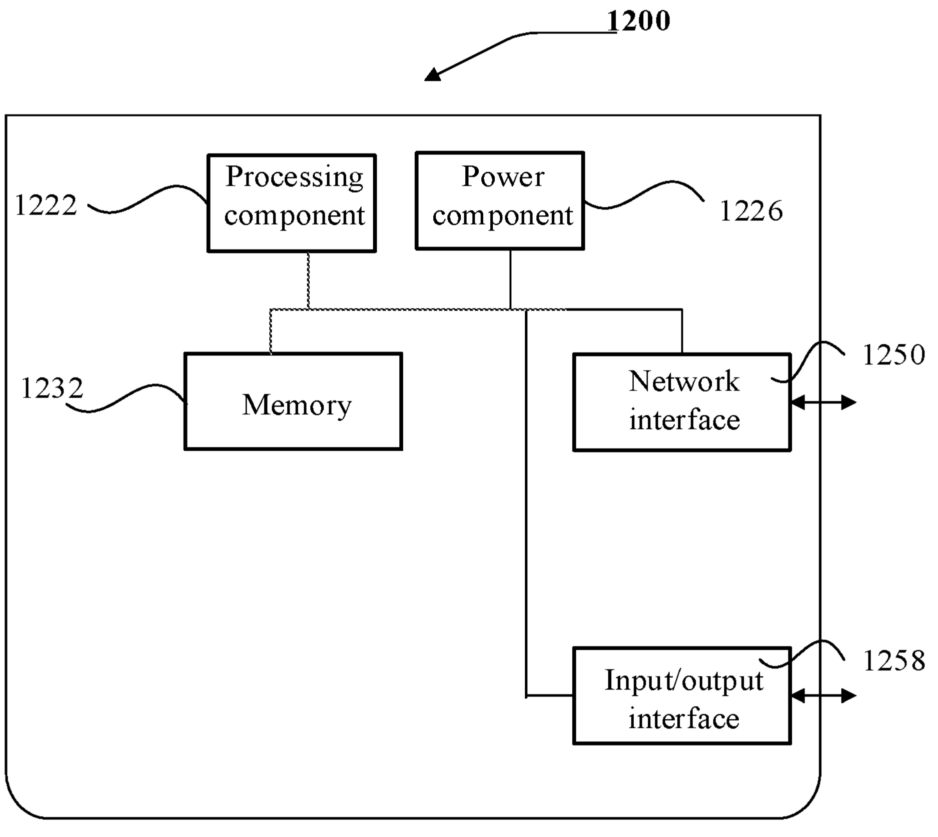
FIG. 10 is a second schematic structural diagram of a communication device according to an embodiment of the present disclosure.

As shown in FIG. 10, an embodiment of the present disclosure shows a structure of another communication device. The communication device may be the base station involved in the embodiments of the present disclosure. For example, the communication device 1200 may be provided as a network device. Referring to FIG. 10, the communication device 1200 includes a processing component 1222 that further includes one or more processors, and memory resources represented by a memory 1232 for storing instructions executable by the processing component 1222, such as application programs. The application programs stored in the memory 1232 may include one or more modules each corresponding to a set of instructions. Further, the processing component 1222 is configured to execute the instructions to perform any of the above described methods applied to the communication device.

The communication device 1200 may also include a power component 1226 configured to perform power management of the communication device 1200, wired or wireless network interface(s) 1250 configured to connect the communication device 1200 to a network, and an input/output (I/O) interface 1258. The communication device 1200 may operate based on an operating system stored in the memory 1232, such as Windows Server™, Mac OS X™, Unix™, Linux™, FreeBSD™, or the like.

The embodiments of the present disclosure provide a configuration method for joint channel estimation, which performs joint channel estimation by receiving configuration information of joint channel estimation delivered by the network device. In this way, it is convenient for the terminal to perform the above joint channel estimation when the condition configured by the configuration information is satisfied, so as to improve the accuracy of the channel estimation and further improve the coverage performance of the network.

Other embodiments of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A communication method, comprising:

reporting, by a terminal, demodulation reference signal (DMRS) bundling capability information supported by the terminal as a terminal capability, wherein the DMRS bundling capability information indicates whether the terminal supports DMRS bundling across slots or across repeated transmissions;

receiving, by the terminal, configuration information of a DMRS bundling from a network device, wherein the configuration information comprises time range information of the DMRS bundling required for the terminal; and performing, by the terminal, an uplink channel transmission based on the configuration information of the DMRS bundling;

wherein a maximum allowable phase difference within a time range is specified for the DMRS bundling, and the DMRS bundling meets following conditions:

the DMRS bundling is used for back-to-back physical uplink control channel (PUCCH) or physical uplink shared channel (PUSCH) transmission;

a frequency domain position does not change; and no frequency hopping occurs between the slots or within a slot.

2. The method according to claim 1, wherein the DMRS bundling capability information is configured for the network device to determine configuration information of a joint channel estimation.

3. The method according to claim 2, wherein the DMRS bundling capability information comprises:

indication information of whether DMRS bundling capability of the terminal supports the joint channel estimation.

4. The method according to claim 3, wherein the method further comprises:

determining the indication information of whether the DMRS bundling capability of the terminal supports the joint channel estimation based on protocol agreement.

5. The method according to claim 4, wherein the DMRS bundling capability comprises one or more of:

power consistency of the terminal; or phase continuity of the terminal.

6. The method according to claim 1, wherein the reporting the DMRS bundling capability information supported by the terminal comprises:

reporting the DMRS bundling capability information as auxiliary information.

7. The method according to claim 6, wherein the reporting the DMRS bundling capacity as the auxiliary information comprises:

explicitly reporting dedicated information carrying the auxiliary information; or implicitly reporting predetermined information carrying the auxiliary information.

8. The method according to claim 1, wherein the method further comprises:

performing a joint channel estimation based on configuration information of the joint channel estimation.

9. The method according to claim 1, wherein the DMRS bundling further meets at least one of following conditions:

precoding does not change;

a modulation does not change; or a beam used does not change.

10. A communication method, comprising:

receiving, by a network device, DMRS bundling capability information reported by a terminal, wherein the DMRS bundling capability information is reported as a terminal capability, the DMRS bundling capability information indicates whether the terminal supports DMRS bundling across slots or across repeated transmissions;

determining, by a network device, configuration information of a DMRS bundling according to the DMRS bundling capability information, wherein the configuration information comprises time range information of the DMRS bundling required for the terminal; and delivering, by a network device, the configuration information of the DMRS bundling, wherein the configuration information is configured for the terminal to perform an uplink channel transmission;

wherein a maximum allowable phase difference within a time range is specified for the DMRS bundling, and the DMRS bundling meets following conditions:

the DMRS bundling is used for back-to-back physical uplink control channel (PUCCH) or physical uplink shared channel (PUSCH) transmission;

a frequency domain position does not change; and no frequency hopping occurs between the slots or within a slot.

11. The method according to claim 10, wherein the configuration information comprises N sets, wherein Nis an integer greater than or equal to 1.

12. The method according to claim 11, wherein the method further comprises:

delivering activation information for activating the configuration information, wherein the activation information is configured for activating the terminal to support M sets of the configuration information, wherein M is a positive integer less than or equal to N.

13. The method according to claim 12, wherein the delivering the activation information for activating the configuration information comprises:

delivering the activation information of the configuration information through downlink control information (DCI) or medium access control-control element (MAC-CE).

14. The method according to claim 10, wherein the method further comprises:

determining configuration information of a joint channel estimation according to the DMRS bundling capability information.

15. The method according to claim 14, wherein the determining the configuration information of the joint channel estimation according to the DMRS bundling capability information comprises:

determining, in response to the DMRS bundling capability information indicating that the terminal meets a condition for the joint channel estimation, the configuration information for the terminal to perform the joint channel estimation; or determining whether the DMRS bundling capability information meets a threshold range agreed in a protocol; in response to the DMRS bundling capability information meeting the threshold range agreed in the protocol, determining the configuration information for the terminal to perform the joint channel estimation.

16. The method according to claim 10, wherein the method further comprises:

scheduling, in response to the terminal meeting one or more predetermined conditions, the uplink channel transmission of the terminal, wherein the terminal performs the joint channel estimation based on the configuration information during the uplink channel transmission.

17. A communication apparatus, wherein the apparatus is applied to a terminal, and comprises: a processor and an interface circuit;

wherein the interface circuit is configured to receive a code instruction and transmit the code instruction to the processor;

wherein the processor is configured to execute the code instruction to report demodulation reference signal (DMRS) bundling capability information supported by the terminal as a terminal capability, wherein the DMRS bundling capability information indicates whether the terminal supports DMRS bundling across slots or across repeated transmissions;

receive configuration information of a DMRS bundling from a network device, wherein the configuration information comprises time range information of the DMRS bundling required for the terminal; and perform an uplink channel transmission based on the configuration information of the DMRS bundling;

wherein a maximum allowable phase difference within a time range is specified for the DMRS bundling, and the DMRS bundling meets following conditions:

the DMRS bundling is used for back-to-back physical uplink control channel (PUCCH) or physical uplink shared channel (PUSCH) transmission;

a frequency domain position does not change; and no frequency hopping occurs between the slots or within a slot.

18. A communication apparatus, wherein the apparatus is applied to a network device, and comprises: a processor and an interface circuit;

wherein the interface circuit is configured to receive a code instruction and transmit the code instruction to the processor;

wherein the processor is configured to execute the code instruction to implement the configuration method according to claim 10.

* * * * *